US007404019B2

(12) United States Patent
Moyer et al.

(10) Patent No.: US 7,404,019 B2
(45) Date of Patent: Jul. 22, 2008

(54) METHOD AND APPARATUS FOR ENDIANNESS CONTROL IN A DATA PROCESSING SYSTEM

(75) Inventors: William C. Moyer, Dripping Springs, TX (US); Michael D. Fitzsimmons, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 478 days.

(21) Appl. No.: 10/857,208

(22) Filed: May 26, 2004

(65) Prior Publication Data

US 2004/0221173 A1 Nov. 4, 2004

Related U.S. Application Data

(63) Continuation-in-part of application No. 10/384,024, filed on Mar. 7, 2003.

(51) Int. Cl.
G06F 13/12 (2006.01)
G06F 3/00 (2006.01)
G06F 13/00 (2006.01)

(52) U.S. Cl. .......................... 710/65; 710/30; 710/107; 712/204

(58) Field of Classification Search .................. None
See application file for complete search history.

(56) References Cited

U.S. PATENT DOCUMENTS

| 5,519,842 A | * | 5/1996 | Atallah et al. ............... 711/202 |
| 5,524,256 A | * | 6/1996 | Turkowski .................. 712/300 |
| 5,572,713 A | * | 11/1996 | Weber et al. .................. 703/27 |
| 5,574,923 A | | 11/1996 | Heeb et al. |
| 5,828,853 A | * | 10/1998 | Regal .......................... 710/315 |
| 5,867,690 A | * | 2/1999 | Lee et al. ..................... 710/65 |
| 5,898,896 A | | 4/1999 | Kaiser et al. |
| 5,907,865 A | | 5/1999 | Moyer |
| 6,046,676 A | | 4/2000 | Ward et al. |
| 6,115,819 A | | 9/2000 | Anderson |

(Continued)

FOREIGN PATENT DOCUMENTS

EP 0 932 096 A2 7/1998

OTHER PUBLICATIONS

U.S. Appl. No. 10/094,082 entitled "Data Processing System With Peripheral Access Protection and Method Therefor", filed Mar. 8, 2002 (not published at this time).

*Primary Examiner*—Alan S Chen
(74) *Attorney, Agent, or Firm*—Joanna G. Chiu; Susan Hill; Ranjeev Singh (57) ABSTRACT

A method for providing endianness control in a data processing system includes initiating an access which accesses a peripheral, providing a first endianness control that corresponds to the peripheral, and completing the access using the endianness control to affect the endianness order of the information transferred during the access. In one embodiment, the first endianness control overrides a default endianness corresponding to the access. The default endianness may be provided by a master endianness control corresponding to a master requesting the current access. A data processing system includes a first bus master, first and second peripherals, first endianness control corresponding to the first peripheral and second endianness control corresponding to the second peripheral, and control circuitry which uses the first endianness control to control endianness for an access between the first bus master and the first peripheral. In one embodiment, the data processing system may include multiple masters.

14 Claims, 6 Drawing Sheets

— 132, 134

| DESCRIPTION | SETTINGS |
|---|---|
| MASTER ENDIANNESS - THIS FIELD DETERMINED HOW THE ENDIANNESS OF THE MASTER IS DETERMINED. | 00 ACCESSES FROM THIS MASTER ARE NOT FORCED, REGARDLESS OF ACTUAL PROCESSOR MODE.<br>01 ACCESSES FROM THIS MASTER ARE BYTE-REVERSED FROM THE NORMAL ACCESS ORDERING.<br>10 ACCESSES FROM THIS MASTER ARE FORCED TO LITTLE-ENDIAN MODE, REGARDLESS OF ACTUAL PROCESSOR MODE.<br>11 ACCESSES FROM THIS MASTER ARE FORCED TO BIG-ENDIAN MODE, REGARDLESS OF ACTUAL PROCESSOR MODE. |

U.S. PATENT DOCUMENTS 6,393,548 B1  5/2002  Kerstein et al.
2002/0138677 A1  9/2002  Brock et al.
2004/0059848 A1 *  3/2004  Chang et al. .................. 710/65

* cited by examiner

| DESCRIPTION | SETTINGS |
|---|---|
| MASTER ENDIANNESS – THIS FIELD DETERMINED HOW THE ENDIANNESS OF THE MASTER IS DETERMINED. | 00 ACCESSES FROM THIS MASTER ARE NOT FORCED, REGARDLESS OF ACTUAL PROCESSOR MODE.<br>01 ACCESSES FROM THIS MASTER ARE BYTE-REVERSED FROM THE NORMAL ACCESS ORDERING.<br>10 ACCESSES FROM THIS MASTER ARE FORCED TO LITTLE-ENDIAN MODE, REGARDLESS OF ACTUAL PROCESSOR MODE.<br>11 ACCESSES FROM THIS MASTER ARE FORCED TO BIG-ENDIAN MODE, REGARDLESS OF ACTUAL PROCESSOR MODE. |

| DESCRIPTION | SETTINGS |
|---|---|
| PERIPHERAL ENDIANNESS CONTROL FOR CORRESPONDING MASTER – THIS FIELD DETERMINED HOW THE BYTE ORDERING OF THE MASTER IS DETERMINED. | 00 ACCESSES FROM THIS MASTER ARE NOT FORCED, REGARDLESS OF ACTUAL PROCESSOR MODE.<br>01 ACCESSES FROM THIS MASTER ARE BYTE-REVERSED FROM THE NORMAL ACCESS ORDERING.<br>10 ACCESSES FROM THIS MASTER ARE FORCED TO LITTLE-ENDIAN MODE, REGARDLESS OF ACTUAL PROCESSOR MODE.<br>11 ACCESSES FROM THIS MASTER ARE FORCED TO BIG-ENDIAN MODE, REGARDLESS OF ACTUAL PROCESSOR MODE. |

FIG. 10
-PRIOR ARTns
METHOD AND APPARATUS FOR ENDIANNESS CONTROL IN A DATA PROCESSING SYSTEM

This is a continuation-in-part application of application Ser. No. 10/384,024, filed Mar. 7, 2003.

FIELD OF THE INVENTION

The present invention relates to a data processing system, and more particularly, to endianness control in a data processing system.

RELATED ART

Processors may read and write binary values to and from memory. The data may be stored in memory according to various endian formats, such as, for example, big-endian or little-endian formats. As used in the description of FIGS. 9 and 10, endianness refers to the byte ordering of bytes within a word or halfword. In this case, endianness may also be referred to as byte ordering. One commonly-used data storage format is illustrated in FIG. 9 and is referred to as big-endian format, and a second commonly-used format is illustrated in FIG. 10 and is referred to as little-endian format.

Figure 9:
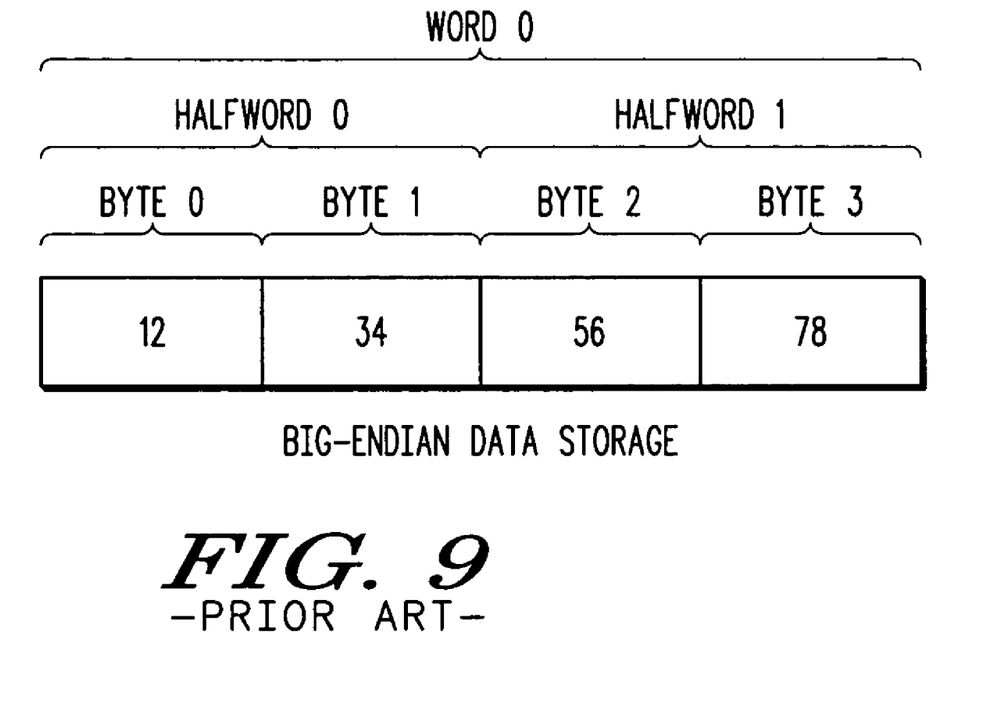
FIG. 9 illustrates a prior art convention for storing data in a big-endian format.
Figure 10:
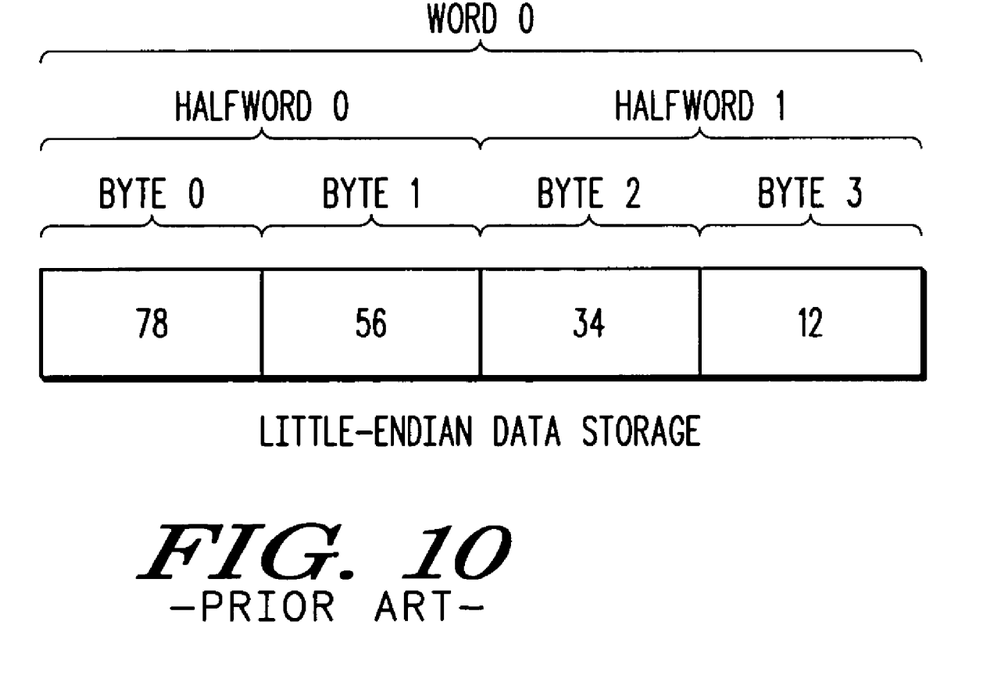
FIG. 10 illustrates a prior art convention for storing data in a little-endian format.

In FIG. 9, four byte memory locations are illustrated. The four memory locations may be used to store four bytes of information referred to as byte 0, byte 1, byte 2, and byte 3. In another form, the four storage locations in FIG. 9 may be used to store a halfword 0 and a halfword 1. As illustrated in FIG. 9, each halfword is a 16-bit value that includes two bytes, and each word is a 32-bit value that includes four bytes. Note that alternatively, words and halfwords can be defined differently. For example, a word can be a 16-bit value and a halfword an 8-bit value. Therefore, the storage locations in FIG. 9 allow byte, halfword, and word storage of data.

Big-endian and little-endian differ in how halfwords and words are stored. Referring to FIG. 9, halfword 0 is stored in two byte locations referred to as byte 0 and byte 1. Byte 0 is a most significant portion of the halfword and byte 1 is a least significant portion of the halfword. Byte 0 stores the value 12 in hexadecimal and byte 1 stores the value 34 in hexadecimal. Therefore, halfword 0 will be read from FIG. 9 as being a hexadecimal value 1234. In a similar manner, halfword 1 will be read from memory, having a most significant byte of value 56 in hexadecimal and a least significant byte of value 78 in hexadecimal so that halfword 1 stores the hexadecimal value 5678.

In FIG. 9, byte 0 will have an address value less than byte 1, byte 1 will have an address value less than byte 2, and byte 2 will have an address value less than byte 3. For example, if byte 0 was located in memory such that byte 0 has an address of 50 hexadecimal, byte 1 will have an address of 51 hexadecimal, byte 2 will have an address of 52 hexadecimal, and byte 3 will have an address of 53 hexadecimal. Therefore, for example, byte 3 is referred to as residing in a higher address space than byte 0, 1, or 2. Therefore, when reading halfwords or words from memory, most significant bytes in the big-endian formats are stored in low address space whereas least significant byte portions are stored in a higher address space than the most significant bit portions.

When a 32-bit word is stored in FIG. 9, the value read will be 12345678 hexadecimal due to the fact that byte 0 is a most significant byte and byte 3 is a least significant byte.

FIG. 10 illustrates the little-endian format. Halfword 0 of FIG. 10 will be read from memory as having a value of 5678. This is because, when using little-endian storage format, most significant bytes are stored in a higher address space than least significant bytes. This little-endian format is the reverse of the big-endian format. Therefore, halfword 0 will be read as a value 5678 hexadecimal, and halfword 1 will be read as a value 1234 hexadecimal. If a 32-bit word value referred to as word 0 is read from memory in FIG. 10, this word will have a hexadecimal value of 12345678.

In summary, if a 32-bit word is read from FIG. 9 using a big-endian format, that 32-bit value would be hexadecimal 12345678. Also if a 32-bit word is read from FIG. 10 using the little-endian format, the hexadecimal value 12345678 is read. However, as one can see from FIGS. 9 and 10, even though both reads result in the same value, the individual bytes of FIGS. 9 and 10 are reversed when compared to each other.

This inherent difference in bit or byte ordering between different endian formats results in problems within data processing systems such as multiple master and multiple peripheral data processing systems which seek to operate using different endian formats. Therefore, a need exists for a data processing system that allows for flexible and dynamic control of endianness for data processing systems having one or more masters and one or more peripherals.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As described above, data may be stored in memory according to various endian formats, such as, for example, big-endian or little-endian formats. As will be used in the description of FIGS. 1-8, endianness refers to the byte ordering of bytes within a word or halfword. Therefore, in this case, endianness may also be referred to as byte ordering. However, alternatively, endianness may also refer to bit ordering of bits within a byte, word, or halfword. Endianness may also refer to word orderings or halfword orderings, etc. That is, endianness may refer to the ordering of any "n" number of bits (or bytes) within a grouping of bits (or bytes), such as, for example, within a byte, halfword, word, longword, doubleword, etc. Therefore, endianness, in general, refers to this broad concept of the ordering of any "n" number of bits or bytes, and is not limited to byte ordering. Also, note that in one embodiment, a word corresponds to 32 bits and a halfword to 16 bits. However, in alternate embodiments, a word may include a different number of bits, such as, for example, 16 bits or 64 bits.

One embodiment of the present invention provides for a flexible endianness control mechanism within a data processing system through the use of peripheral endianness controls which allows for endianness control on a per-peripheral basis and on a per access basis. For example, in one embodiment, the data processing system may include shared peripherals which must respond to masters running in different endian modes. Also, for software compatibility with previous systems, the peripherals may need to respond with a memory image which is different from the accessing master's current endianness, due to the way the software was originally written. Furthermore, peripherals may need to respond to different endiannesses without receiving indication of the current master's endian mode. In one embodiment, master endianness control fields may be used to provide default endian modes for each master in the system. Furthermore, the peripheral endianness controls may selectively override the endian mode of each master to allow, for example, for backwards compatibility with previous system configurations or software conventions. Note that the peripheral endianness controls and master endianness controls may apply to single master or multiple master data processing systems having dedicated peripherals, shared peripherals, or any combination thereof.

Another embodiment of the present invention provides a flexible peripheral access protection mechanism within a data processing system in order to obtain a more secure operating environment. For example, the data processing system may include a combination of trusted and untrusted bus masters needing to access shared peripherals. One embodiment allows for the dynamic update by a trusted bus master of privileges and trust attributes for each bus master and of access controls for each peripheral. A trusted bus master is therefore able to establish which bus masters have permission to access which peripheral in order to protect the data processing system from corruption due to errant or hostile software running on untrusted bus masters.

Through the use of a bus master identifier, trust attributes, and privilege levels, access to the requested peripheral can either be allowed or denied based on the permissions established by the trusted bus master. For example, in one embodiment, each master within the data processing system includes a corresponding privilege level modifier and corresponding trust attributes for particular bus access types (such as read and write accesses). Also, in one embodiment, each peripheral within the data processing system includes a corresponding trust attribute, write protect indicator, and a privilege protect indicator. Therefore, in one embodiment, a bus access by a bus master to a peripheral is allowed when the bus master has the appropriate privilege level and appropriate level of trust required by the peripheral (and the peripheral is not write protected, if the bus access is a write access). Also, through the use of privilege level modifiers, a bus master can be forced to a particular privilege level for a particular bus access.

Figure 1:
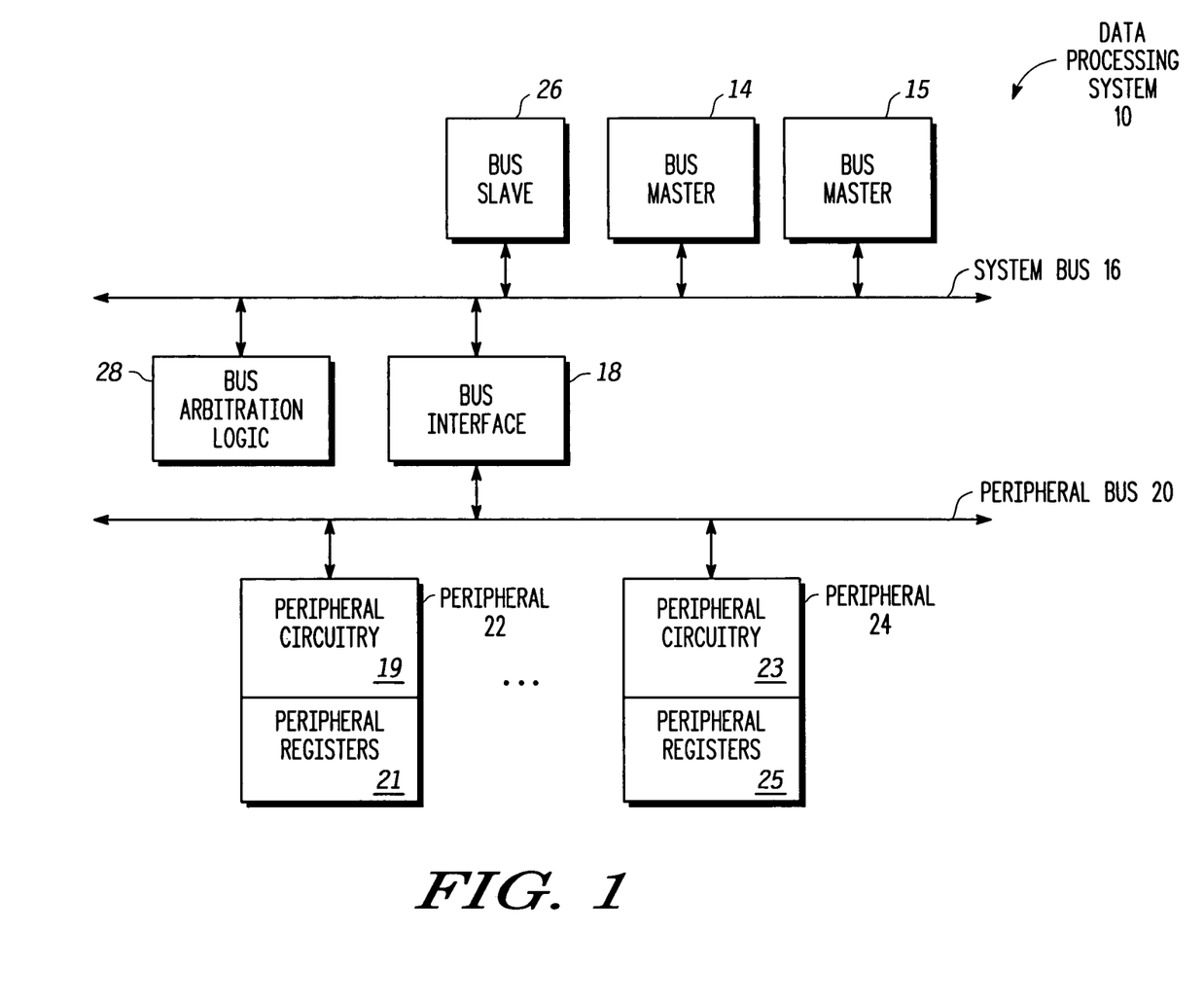
FIG. 1 illustrates, in block diagram form, a data processing system in accordance with one embodiment of the present invention.

FIG. 1 illustrates one embodiment of a data processing system 10. Data processing system 10 includes a bus slave 26, a bus master 14, a bus master 15, bus arbitration logic 28, a system bus 16, a bus interface 18, a peripheral bus 20, and peripherals 22 and 24. Bus slave 26, bus master 14, bus master 15, bus arbitration logic 28, and bus interface 18 are all bidirectionally coupled to system bus 16. Bus interface 18, peripheral 22, and peripheral 24 are all bidirectionally coupled to peripheral bus 20. Peripheral 22 includes peripheral circuitry 19 and peripheral registers 21, and peripheral 24 includes peripheral circuitry 23 and peripheral registers 25. Although only two peripherals 22 and 24 are illustrated in FIG. 1, data processing system 10 may include any number of peripherals coupled to peripheral bus 20. (Also note that each of peripherals 22 and 24 may be shared peripherals by all or some of the masters in data processing system 10, or may be dedicated peripherals accessible by only one master.) Likewise, any number of bus masters and slaves may be coupled to system bus 16 and are not limited to those shown in FIG. 1. Also, while FIG. 1 illustrates bus arbitration logic 28 as a separate unit coupled to system bus 16, portions of bus arbitration logic 28 may be located in each of the bus masters (or in a portion of the bus masters) coupled to system bus 16. (Bus arbitration logic 28 may operate as any known bus arbiter in the art today).

In one embodiment, all of data processing system 10 is included on a single integrated circuit. Alternatively, data processing system 10 may be included on any number of integrated circuits.

In one embodiment, bus master 14 and bus master 15 may be processors, such as microprocessors, digital signal processors, etc., or may be any other type of master device, such as a direct memory access (DMA) unit. One or more of these bus masters may be trusted bus masters which are less susceptible to corruption than untrusted bus masters. For example, a trusted bus master may execute instructions that are completely controlled by the manufacturer of the bus master or the SoC (i.e. the software running on a trusted master can be considered trusted software.) That is, in one embodiment, third party software is unable to execute on a trusted master and no third parties are allowed access to the trusted master. Alternatively, the level of trust (i.e. the level of security) for a trusted bus master may vary from completely trusted to less trusted and depends on the design of data processing system 10, but is generally more trusted than untrusted bus masters.

Similarly, any one or more of bus masters 14 and 15 may be untrusted bus masters, which are generally more accessible or susceptible to corruption. In one embodiment, untrusted bus masters may be general applications processors that may receive and execute third-party software (e.g. user developed software) or any other untrusted software (where the contents and the function of the software are generally unknown). Since the software is untrusted, it may be errant or hostile software which may attempt to corrupt other portions of data processing system 10 (such as other trusted bus masters or peripherals 22 and 24), introduce a virus into data processing system 10, or access secured information within bus master 14 or 15, peripherals 22 or 24, bus slave 26, or elsewhere within data processing system 10.

Also, note that a particular bus master may be considered trusted for some types of accesses and untrusted for others. For example, a same bus master may be considered trusted for reads and untrusted for writes. Therefore, each master can have different levels of trust for different types of accesses. Also, each bus master can have different privilege levels. For example, in one embodiment, one bus master may operate with a higher privilege level (such as in supervisor mode) while others may operate with a lower privilege level (such as in user mode). A particular privilege level is used to determine which resources a master is able to access.

Therefore, in one embodiment, as will be described below, each master within data processing system 10 has a corresponding set of trust attribute fields which determine the level of trust for the corresponding master for a particular type of bus access. Also, each bus master has a corresponding privilege modifier field which allows the privilege level for the corresponding master to be selectively adjusted for a particular bus access. Similarly, each peripheral such as peripherals 22 and 24 has a corresponding set of access control fields which determine the level of access supported by the given peripheral. For example, a particular peripheral may give more access to those masters that are identified as trusted or those that operate in a supervisor mode (i.e. have a supervisor privilege level). These privilege and trust attribute fields for the bus masters and the access control fields for the peripherals will be discussed in more detail below in reference to FIGS. 2-5.

Also, note that each bus master within data processing system 10 may operate according to a particular endian mode, where the endian modes of different bus masters may differ. Therefore, in one embodiment, as will be described below, a set of peripheral endianness control registers is used to determine in which endian mode to perform a current access from a particular bus master, where, in one example, one or more peripherals has a corresponding peripheral endianness control register which provides endianness control information for each master capable of accessing that peripheral. In this manner, for each access, the accessed peripheral can respond to the requesting master using the appropriate endianness. Also, in one embodiment, a set of master endianness control fields provides endianness control information corresponding to each master, where this endianness control information may be selectively overridden by the endianness control information provided by the peripheral endianness control registers. For example, these master endianness control fields may provide default endianness information for each master. These master endianness control fields and peripheral endianness control registers will be discussed in more detail below in reference to FIGS. 2-8.

Referring back to FIG. 1, bus slave 26 may be any slave device, such as, for example, a memory accessible by bus masters 14 and 15, as well as any type of peripheral which resides on the system bus, including the same types of peripherals as peripheral 22 and 24. Peripherals 22 and 24 may be any type of peripheral, such as a universal asynchronous receiver transmitter (UART), a real time clock (RTC), a keyboard controller, etc. Peripheral circuitry 19 permits communication between peripheral bus 20 and peripheral registers 21. Similarly, peripheral circuitry 23 permits communication between peripheral bus 20 and peripheral registers 25. In an alternate embodiment, peripheral 22 may be a memory unit where peripheral registers 21 would be memory address locations instead.

In operation, bus masters 14 and 15 request access of system bus 16 to request access to other slave devices coupled to system bus 16, such as bus slave 26, or to request access to peripherals 22 and 24 via bus interface 18. Bus interface 18, as will be described below, determines whether a request or particular type of request to a particular peripheral is allowed. If not allowed, bus interface 18 may provide a bus error response via system bus 16. However, if the request is allowed, bus interface 18 will provide any necessary bus protocol and endianness control information to complete the requested bus access. As mentioned above, each bus master 14 and 15 may have limited access to peripherals 22 and 24 as determined by its privilege level and level of trust and the access control fields of the peripheral being accessed. Furthermore, each bus master 14 and 15 may operate according to different endian modes, and each accessed peripheral 22 and 24 may respond accordingly, based on the settings within the peripheral endianness control registers.

Figure 2:
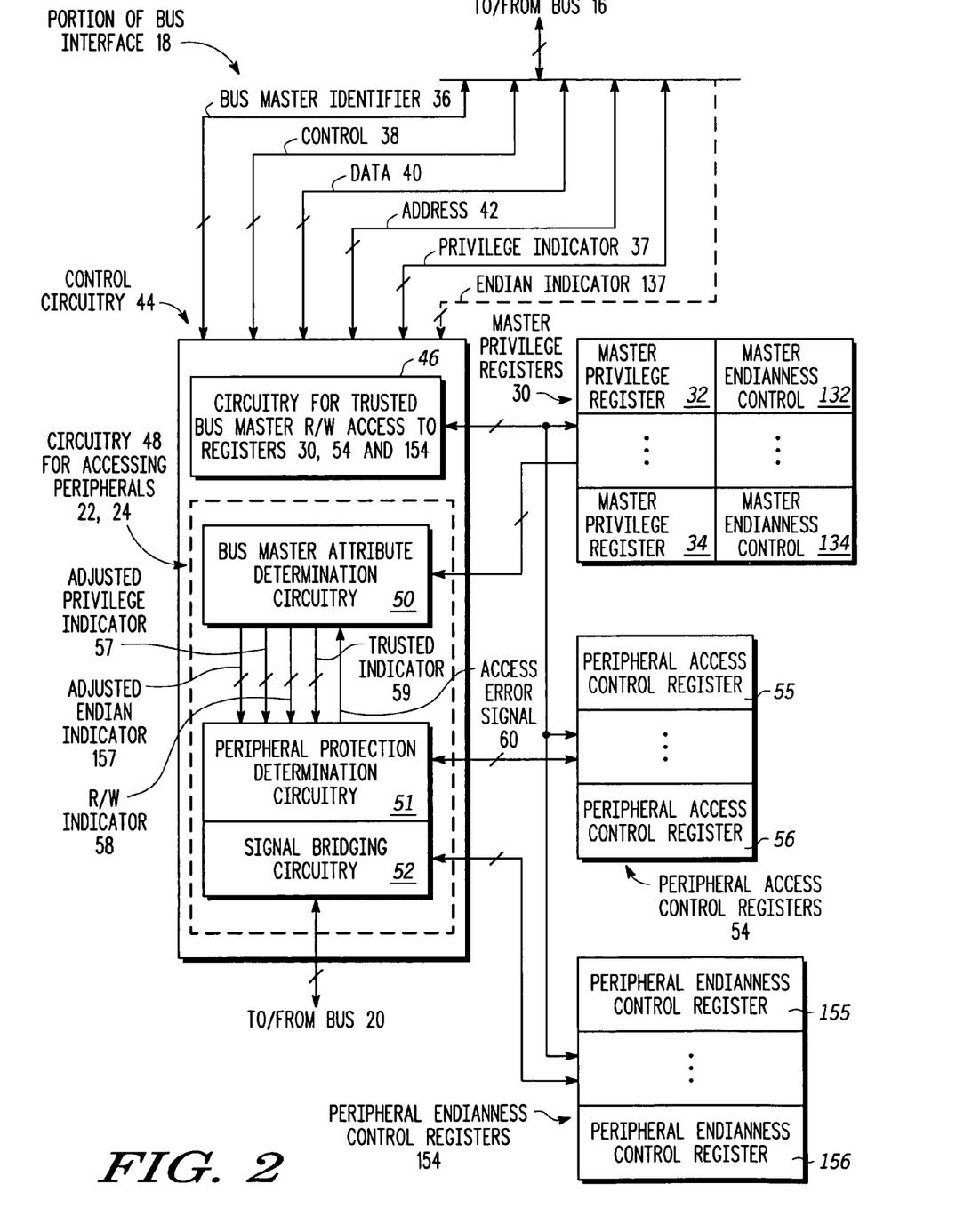
FIG. 2 illustrates, in block diagram form, a portion of a bus interface of FIG. 1, in accordance with one embodiment of the present invention.

FIG. 2 illustrates a portion of bus interface 18 of FIG. 1 in accordance with one embodiment of the present invention. Bus interface 18 includes control circuitry 44, master privilege registers 30, peripheral access control registers 54, and peripheral endianness control registers 154. Control circuitry 44 provides and receives bus master identifier 36, address 42, data 40, control 38, and privilege indicator 37 via system bus 16. Optionally, control circuitry 44 receives endian indicator 137 (also referred to as an endian signal 137) via system bus 16, as indicated by the dotted line. (In alternate embodiments, endian indicator 137, if present, may be provided directly from one or more of masters 14 and 15 as, for example, side-band signals rather than via system bus 16.) System bus 16, in alternate embodiments, may also provide additional information such as a type indicator indicating whether the current access is for data or instructions or a size indicator indicating the size of a current access.

Control circuitry 44 includes circuitry 46 for trusted bus master read/write (R/W) access to registers 30, 54, and 154 that are bidirectionally coupled to each of master privilege registers 30, peripheral access control registers 54, and peripheral endianness control registers 154. Control circuitry 44 also includes circuitry 48 for accessing peripherals 22, 24. Circuitry 48 includes bus master attribute determination circuitry 50 which receives information from master privilege registers 30 and also includes peripheral protection determination circuitry 51 which receives information from peripheral access control registers 54. Control circuitry 48 also includes signal bridging circuitry 52 which receives information from peripheral endianness control registers 154 and is bidirectionally coupled to peripheral bus 20 in order to provide and receive appropriate signals to and from peripherals 22 and 24. Bus master attribute determination circuitry 50 also provides adjusted endian indicator 157, adjusted privilege indicator 57, R/W indicator 58, and trusted indicator 59 to peripheral protection determination circuitry 51 and receives access error signal 60 from peripheral protection determination circuitry 51. Note that access error signal 60 may also be communicated back to bus masters 14 and 15 via system bus 16. In an alternate embodiment, access error signal 60 is communicated via system bus 16 and is not provided to bus master attribute determination circuitry 50.

Master privilege registers 30 includes master privilege register 32 and master endianness control 132, master privilege register 34, and master endianness control 134. In one embodiment, each of master privilege registers 30 corresponds to a master on system bus 16. Also, in one embodiment, master privilege registers 30 may include only a single register, or alternatively, may include any number of registers, as will be described further below in reference to FIG. 3. Also, note that master endianness controls 132 and 134 may be additional fields located within master privilege registers 32 and 34, respectively, or master endianness controls 132 and 134 may be included in one or more separate registers within master privilege registers 30 or elsewhere within bus interface 18.

Peripheral access control registers 54 include peripheral access control register 55 and peripheral access control register 56. In one embodiment, each of the peripheral access control registers corresponds to a peripheral on peripheral bus 20. Also, in one embodiment, peripheral access control registers 54 may include only a single register, or alternatively, may include any number of registers, as will be described further below in reference to FIG. 3. Peripheral endianness control registers 154 include peripheral endianness control register 155 and peripheral endianness control register 156. In one embodiment, each of the peripheral endianness control registers corresponds to a peripheral on peripheral bus 20. Also, in one embodiment, peripheral endian control registers 154 may include only a single register, or alternatively, may include any number of registers, as will be described further below in reference to FIG. 7. Also, in one embodiment, note that peripheral access control registers 54 and peripheral endianness control registers 154 may be combined into one ore more registers including both access and endianness control information for each peripheral.

Also, note that master privilege registers 30, peripheral access control registers 54, and peripheral endianness control registers 154 may be located anywhere within data processing system 10 and do not have to be located within bus interface 18. In some alternate embodiments of the present invention, peripheral access control registers and peripheral endianness control registers may be distributed within each peripheral 22 and 24, or bus slave 26, and master privilege registers may be distributed, or may reside in one or more bus slaves 26.

In operation, bus interface 18 provides access to master privilege registers 30, peripheral access control registers 54, and peripheral endianness control registers 154 based on bus master identifier 36. Bus master identifier 36 identifies to control circuitry 44 which bus master is providing the current request. For example, in one embodiment, each bus master in data processing system 10 may have a corresponding identification (ID) number. For example, bus master 14 may have a corresponding ID number of 0 and bus master 15 may have a corresponding ID number of 1. Any bus masters in data processing system 10 can therefore be assigned unique ID numbers. When a particular bus master requests access to a peripheral, its corresponding ID number can be provided to control circuitry 44 as bus master identifier 36. In this example, if bus master identifier 36 is 0, bus master 14 is indicated. In alternate embodiments, any type of identification system may be used to differentiate among different bus masters.

Bus interface 18, via circuitry 46, ensures that only a trusted bus master is able to obtain R/W access to master privilege registers 30, peripheral access control registers 54, and peripheral endianness control registers 154. (Alternatively, circuitry 46 may allow untrusted masters to access some or all of these registers. For example, in one embodiment, circuitry 46 may allow only trusted masters to access registers 30 and 54 and may allow trusted or untrusted masters to access registers 154.) In the illustrated embodiment, circuitry 46 compares the incoming bus master identifier 36 to determine if a trusted bus master is requesting R/W access to registers 30, registers 54, or registers 154. In one embodiment, circuitry 46 includes a list which identifies which bus masters are allowed to modify registers 30, 54, and 154. For example, in one embodiment, only one of masters 14 and 15 may be considered a trusted master and only that trusted master has the ability to modify registers 30, 54, and 154. Alternatively, circuitry 46 may include other circuitry that ensures that only trusted masters modify registers 30, 54, and 154. Also, circuitry 46 may make this determination based on other attributes in addition to or in place of bus master identifier 36. For example, in an alternate embodiment, circuitry 46 may use privilege indicator 37 (which indicates a privilege level of the requesting bus master for the current bus access) to make the determination. In this manner, a trusted bus master is able to set the fields of registers 30, 54, and 154 to control access of peripherals 22 and 24. In one embodiment, a trusted bus master may program the values into registers 30, 54, and 154 upon power up, upon reset, in response to initiation of a software application, or at any other appropriate time. This allows for dynamic access to registers 30, 54, and 154 such that they may be updated as necessary. Alternatively, though, the values within registers 30, 54, and 154 may be programmed a single time (such as by using a write once only memory), programmed only a limited amount of times, or may be hardwired. Prior to discussing bus master attribute determination circuitry 50 within circuitry 48 for accessing peripherals 22, 24, the contents of registers 30 will be described in reference to FIGS. 3 and 6.

Figure 3:
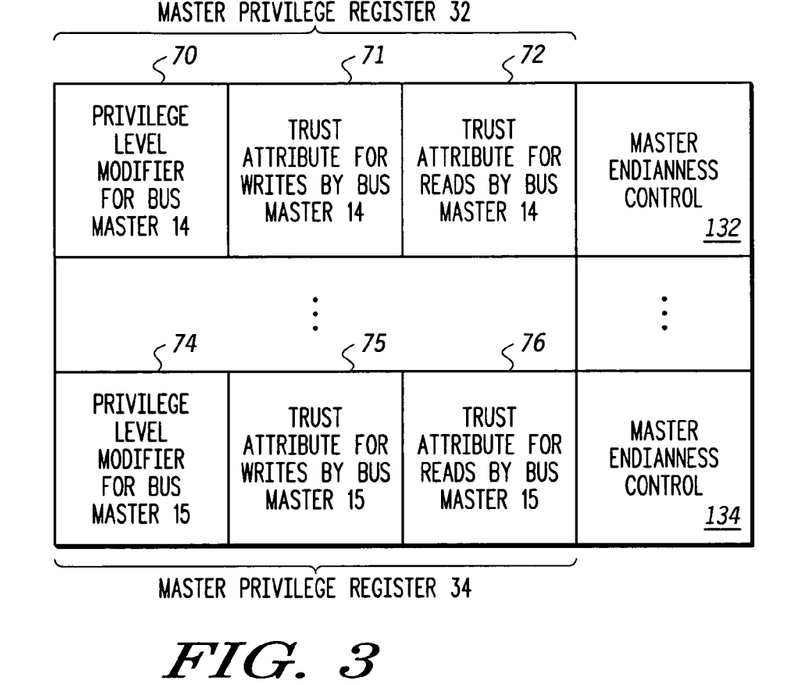
FIG. 3 illustrates, in block diagram form, master privilege registers and master endianness control fields in accordance with one embodiment of the present invention.

FIG. 3 illustrates one embodiment of master privilege registers 30 where, in the illustrated embodiment, master privilege registers 30 includes a master privilege register 32 and master endianness control 132, both corresponding to bus master 14 and a master privilege register 34 and master endianness control 134, both corresponding to bus master 15. In one embodiment, master endianness control 132 may be included as an additional field within master privilege register 32 (similar to fields 70-72). Alternatively, master endianness control 132 may be stored in a separate registers. (Note that master endianness control 132 and 134 may also be referred to as master endianness control fields 132 and 134, respectively.) Therefore, in the current embodiment, master privilege registers 30 include one master privilege register and a master endianness control field for each bus master. However, in alternate embodiments, a single register may be used to store the necessary information for all masters, or, alternatively, any number and combination of registers may be used. Master privilege register 32 and master endianness control 132 will be discussed herein as examples; however, note that the descriptions for master privilege register 32 and master endianness control 132 also apply to all master privilege registers and master endianness control fields in master privilege registers 30 such as master privilege register 34 and master endianness control 134. Master privilege register 32 includes a privilege level modifier for bus master 14 field 70, a trust attribute for writes by bus master 14 field 71, and a trust attribute for reads by bus master 14 field 72.

Privilege level modifier field 70 allows for the current privilege level of bus master 14 for a particular access to be selectively modified or adjusted, as indicated by the value stored in field 70. The current privilege of bus master 14, in one embodiment, is provided by bus master 14 to control circuitry 44 by privilege indicator 37 via system bus 16. In one embodiment, privilege indicator 37 is used to identify whether, during the current bus access, the current bus master (as identified by bus master identifier 36) requesting the bus access has a supervisor or user privilege level. That is, in this embodiment, privilege indicator 37 indicates a privilege level corresponding to one of supervisor or user mode. Therefore, if bus master 14 is performing a bus access, privilege level modifier field 70 may be used to indicate to bus master attribute determination circuitry 50 whether the privilege level of bus master 14 for the current bus access should be adjusted. For example, if operating in supervisor mode, privilege level modifier field 70 may be used to force the privilege level of bus master 14 to user mode. Alternatively, privilege level modifier field 70 can indicate any type of privilege level, and is not limited only to supervisor or user modes. Furthermore, privilege level modifier field 70 may include one or more bits used to provide the privilege level of bus master 14. For example, in one embodiment, one bit within privilege level modifier field 70 may be used to indicate whether or not the privilege level of a requesting bus master during a current bus access should be modified, and another one or more bits may be used to indicate what the adjusted privilege level should be. (Note that in some embodiments, the current privilege level may be the same as the privilege level indicated by field 70, indicated that no adjustment is necessary.)

Trust attribute for writes by bus master 14 field 71 is used to indicate whether bus master 14 is a trusted master for write accesses by bus master 14. Similarly, trust attribute for reads by bus master 14 field 72 is used to indicate whether bus master 14 is a trusted master for read accesses by bus master 14. Therefore, each bus master, such as bus master 14, may have different trust attributes for read or write access. For example, for performing a read access to a peripheral or bus slave, bus master 14 may be considered as a trusted master while for performing a write access from a peripheral or bus slave, bus master 14 may be considered as an untrusted master. Therefore, each of fields 71 and 72 may include one or more bits used to indicate the level of trust of bus master 14 for write and read accesses. In an alternate embodiment, a bus master may have more levels of trust for particular types of bus accesses rather than just being categorized as trusted or untrusted. For example, fields 71 and 72 may indicate one level from a selection of N levels of trust (N>2) for bus master 14.

Note that more or fewer or different fields than those illustrated may be included in master privilege register 32. For example, a single trust attribute field may be used for both writes and reads by bus master 14 where bus master 14 is either considered trusted or untrusted for both reads and writes. Alternatively, trust attributes may be provided for other types of bus accesses.

Note that the descriptions provided above for fields 70-72 also apply for fields 74-76 of master privilege register 34. That is, privilege level modifier for bus master 15 field 74 allows for the privilege level of bus master 15 to be selectively adjusted for a current bus access. Trust attribute for writes by bus master 15 field 75 indicates the level of trust of bus master 15 for a write access, and trust attribute for reads by bus master 15 field 76 indicates the level of trust of bus master 15 for a read access.

Figure 6:
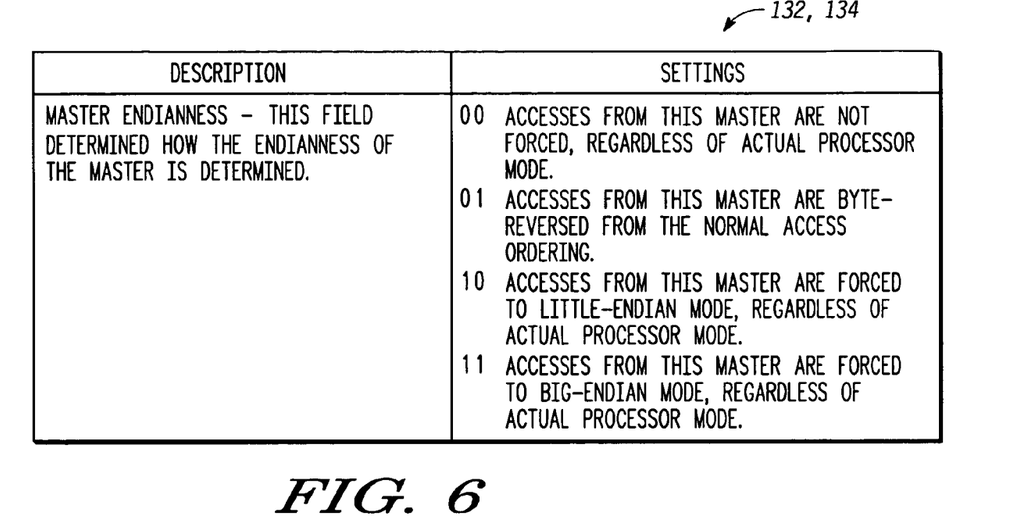
FIG. 6 illustrates descriptions for the master endianness control fields of FIG. 3 in accordance with one embodiment of the present invention.

Master endianness control 132 provides endianness control information for bus master 14. Therefore, if bus master 14 requests the current access (as identified, for example, by bus master identifier 36), master endianness control 132 may be used to provide endianness information. For example, FIG. 6 provides example settings for master endianness control 132 and 134 which determine how the endianness of bus master 14 or bus master 15 is determined. In one embodiment, the endianness determined by master endianness control 132 and 134 is referred to as the default endianness of the requesting master. Referring to FIG. 6, if master endianness control 132 is set to "10," then accesses from bus master 14 are forced to little-endian mode, regardless of the actual endian mode of bus master 14. In this case, adjusted endian indicator 157 would indicate little-endian mode, regardless of the endian mode the requesting bus master is operating in or regardless of the endian mode indicated by endian indicator 137 (if present). If master endianness control 132 is set to "11," then accesses from bus master 14 are forced to big-endian mode, regardless of the actual endian mode of bus master 14. In this case, adjusted endian indicator 157 would indicate big-endian mode, regardless of the endian mode the requesting bus master is operating in or regardless of the endian mode indicated by endian indicator 137 (if present).

Still referring to FIG. 6, if master endianness control 132 is set to "00," then accesses from bus master 14 are not forced to a particular endian mode, regardless of the actual endianness mode. Therefore, if set to "00" then the endian mode indicated by endian indicator 137 (corresponding to the endian mode of the requesting bus master) is used. In this case, adjusted endian indicator 157 indicates the same mode as endian indicator 137. However, if master endianness control 132 is set to "01," then access from bus master 14 are reversed from the mode indicated by endian indicator 137. For example, if endian indicator 137 indicates that bus master 14 is operating in big-endian mode, then, if master endianness control 132 is set to "01," adjusted endian indicator 157 will be set to indicate little-endian mode. In alternate embodiments, a setting of "01" may indicate that a different endianness is used, rather than just the reverse endianness. (Therefore, note that in cases where master endianness control 132 is set to "00" or "01," endian indicator 137 or some other indicator of the endian mode of the requesting processor is provided.)

Note that the descriptions provided above with respect to FIG. 6 and master endianness control 132 also apply to master endianness control 134. Also, note that in alternate embodiments, more or less may bits may be used to provide the endianness information, or other settings may be used. For example, in an alternate embodiment, alternate sets of values may be used for when the bus access is an instruction access or a data access. In this alternate embodiment, based on whether a type indicator indicates data information or instruction information is being accessed during the current access, different sets of values for master endianness control may be applied. Also, in another alternate embodiment, different sets of values may be used based upon the size of the data or information access. For example, one set of values may be used if the current access corresponds to a 16-bit size and a different set of values may be used if the current access corresponds to a 32-bit size. Therefore, each of master endianness control 132 and 134 may include multiple fields rather than the single two-bit field illustrated in FIG. 6 which may be used to control endianness based on requesting master, access type, access size, or any combination thereof.

Returning to FIG. 2, circuitry 48 for accessing peripherals 22, 24 includes bus master attribute determination circuitry 50 which receives address 42, control 38, privilege indicator 37, bus master identifier 36, and optionally, endian indicator 137, and provides adjusted endian indicator 157, adjusted privilege indicator 57, R/W indicator 58, and trusted indicator 59 to peripheral protection determination circuitry 51. Therefore circuitry 50 receives all the information necessary that identifies the type of bus access (read or write), the peripheral requested, the identification of which bus master is making the request, the privilege level of the bus master making the request, and, in some embodiments, the endian mode of the bus master making the request. Using information stored in master privilege registers 30, as was described above, circuitry 50 determines adjusted endian indicator 157, adjusted privilege indicator 57, R/W indicator 58, and trusted indicator 59. For example, a bus access may be initiated which requires access to a peripheral by a bus master (this bus access can be either a read or write bus access). During at least a portion of the bus access, bus master identifier 36 is provided. Bus master identifier 36 is used to select master privilege information and master endianness information (corresponding to the requesting bus master) from master privilege registers 30 for the bus access. The values for adjusted endianness indicator 157, adjusted privilege indicator 57, R/W indicator 58, and trusted indicator 59 can then be determined.

For example, in one embodiment where bus master 14 is performing the current bus access, adjusted privilege indicator 57 is determined based on the current privilege level as indicated by privilege indicator 37 and privilege level modifier field 70. If privilege level modifier field 70 indicates that a particular privilege level should be forced upon bus master 14, then the value of adjusted privilege indicator 57 is set to indicate this forced privilege level. If privilege level modifier field 70 indicates that no privilege should be forced upon bus master 14, then the value of adjusted privilege indicator 57 can be set to indicate the same privilege level as privilege indicator 37. R/W indicator 58 can be determined from control 38 which indicates whether the current bus access is a read or a write access. Trusted indicator 59 is determined based on whether the current bus access is a read or a write access (as can be determined from control 38) and on trust attribute fields 71 and 72. For example, if the current bus access is a write access by bus master 14, then trusted indicator 59 is set to indicate the level of trust indicated by trust attribute field 71. Similarly, if the current bus access is a read access by bus master 14, then trusted indicator is set to indicate the level of trust indicated by trust attribute field 72. Adjusted endianness indicator 157 is determined based on endian indicator 137 (if present) and master endianness control 132. For example, if master endianness control 132 indicates that a particular endian mode is to be forced for bus master 14, then adjusted endianness indicator 157 is set accordingly. If master endianness control 132 indicates that the endian mode indicated by endian indicator 137 is to be reversed, then adjusted endianness indicator 157 is set accordingly.

Adjusted privilege indicator 57, R/W indicator 58, and trusted indicator 59, in combination with peripheral access control registers 54, are then used by peripheral protection determination circuitry 51 to determine whether an access to a peripheral is allowed or, in some cases, whether an access error is generated and communicated via access error signal 60 back to bus master attribute determination circuitry 50 and/or the bus master whose access request caused the error. If access is allowed, adjusted endian indicator 157 and peripheral endianness control registers 154 are used by signal bridging circuitry 52 to perform the allowed access to the peripheral using the appropriate endianness. Prior to discussing peripheral protection determination circuitry 51 and signal bridging circuitry 52 within circuitry 48 for accessing peripherals 22, 24, the contents of registers 54 and 154 will be described in reference to FIGS. 4, 7 and 8.

Figure 4:
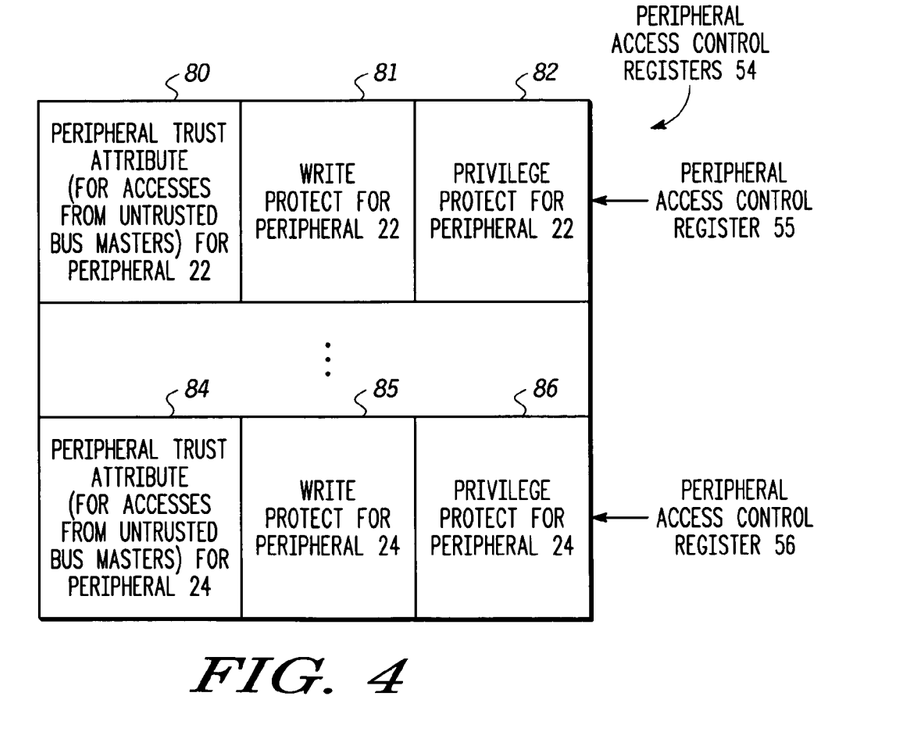
FIG. 4 illustrates, in block diagram form, peripheral access control registers in accordance with one embodiment of the present invention.

FIG. 4 illustrates one embodiment of peripheral access control registers 54 where, in the illustrated embodiment, peripheral access control registers 54 includes peripheral access control register 55 corresponding to peripheral 22 and peripheral access control register 56 corresponding to peripheral 24. Therefore, in the illustrated embodiment, peripheral access control registers 54 include one peripheral access control register for each peripheral. However, in alternate embodiments, a single register may be used to store the necessary information for all peripherals, or, alternatively, any number and combination of registers may be used. Peripheral access control register 55 will be discussed herein as an example; however, note that the descriptions for peripheral access control register 55 also apply to all peripheral access control registers in peripheral access control registers 54 such as peripheral access control register 56. Peripheral access control register 55 includes a peripheral trust attribute for peripheral 22 field 80, a write protect for peripheral 22 field 81, and a privilege protect for peripheral 22 field 82.

Peripheral trust attribute for peripheral 22 field 80 indicates whether peripheral 22 allows accesses (either reads or writes) from an untrusted master. For example, if the bus master performing the current bus access is untrusted, as indicated by the trust attribute fields corresponding to the current bus master (e.g. fields 71 and 72), then the bus access will only be allowed if field 80 indicates that accesses from an untrusted master are allowed. Write protect for peripheral 22 field 81 indicates whether peripheral 22 allows write accesses to itself by a master. For example, if the current bus access being performed by the current bus master (regardless of the level of trust of the bus master) is a write access to peripheral 22, then the write access cannot be performed if field 81 indicates that peripheral 22 is write protected. Privilege protect for peripheral 22 field 82 indicates whether peripheral 22 requires a certain privilege level for the current bus access. Therefore, privilege protect field 82 may include any number of bits that may indicate a minimum privilege level required for access to peripheral 22. In one embodiment, a single bit may be used to indicate whether or not a supervisor privilege is required. Alternatively, more bits may be used to indicate that a minimum one of N-levels of privilege (N>2) is required.

Note that more or fewer or different fields than those illustrated may be included in peripheral access control register 55. For example, separate peripheral trust attribute fields such as peripheral trust attribute field 80 may be used to indicate whether read accesses are allowed from an untrusted master and whether write accesses are allowed from an untrusted master. Also, additional bits or fields may be used to indicate a minimum level of trust of N possible levels of trust (N>2) needed for peripheral 22 to allow a read or a write access.

Note that the descriptions provided above for fields 80-82 also apply for fields 84-86 of peripheral access control register 56. That is, peripheral trust attribute for peripheral 24 field 84 indicates whether peripheral 24 allows accesses (either reads or writes) from an untrusted master. Write protect for peripheral 24 field 85 indicates whether peripheral 24 allows write accesses to itself by a master. Privilege protect for peripheral 24 field 86 indicates whether peripheral 24 requires a certain privilege level for the current bus access.

Figure 7:
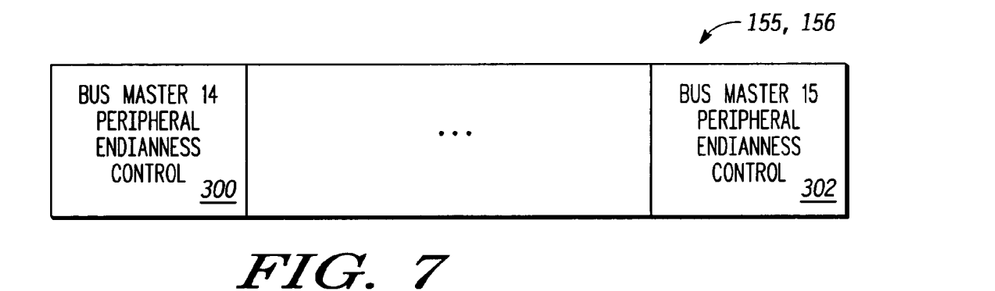
FIG. 7 illustrates a peripheral endianness control register of FIG. 2 in accordance with one embodiment of the present invention.

FIG. 7 illustrates one embodiment of peripheral endianness control registers 154 where, in the illustrated embodiment, peripheral endianness control registers 154 includes peripheral endianness control register 155 corresponding to peripheral 22 and peripheral endianness control register 156 corresponding to peripheral 24. Therefore, in the illustrated embodiment of FIG. 2, peripheral endianness control registers 154 include one peripheral endianness control register for each peripheral. However, in alternate embodiments, a single register may be used to store the necessary endianness control information for all peripherals, or, alternatively, any number and combination of registers may be used. In alternate embodiments, only a subset of peripherals may be provided with peripheral endianness control registers. Peripheral endianness control register 155 will be discussed herein as an example; however, note that the descriptions for peripheral endianness control register 155 also apply to all peripheral endianness control registers in peripheral endianness control registers 154 such as peripheral endianness control register 156.

Peripheral endianness control register 155 includes a bus master 14 peripheral endianness control field 300, and a bus master 15 peripheral endianness control field 302. Therefore, in the illustrated embodiment, peripheral endianness control register 155 includes a peripheral endianness control field for each bus master which accesses the corresponding peripheral (where, in this embodiment, peripheral endianness control register 155 corresponds to peripheral 22). In one embodiment, peripheral endianness control registers 154 selectively override the endianness information provided by master endianness control 132 and 134, depending on the values of fields 300 and 302 (as will be described below in reference to FIG. 8). That is, in one embodiment, the endianness information provided by the peripheral endianness control register corresponding to the current peripheral being accessed can override the endianness information provided by adjusted endian indicator 157 (which may have been provided directly by the accessing master, via, for example, endian indicator 137 or which may have been determined by bus master attribute determination circuitry 50 using the master endianness control of registers 30 corresponding to the requesting master). In this embodiment, master endianness control 132 and 134 may be considered the default endianness information which can be selectively overridden.

Figure 8:
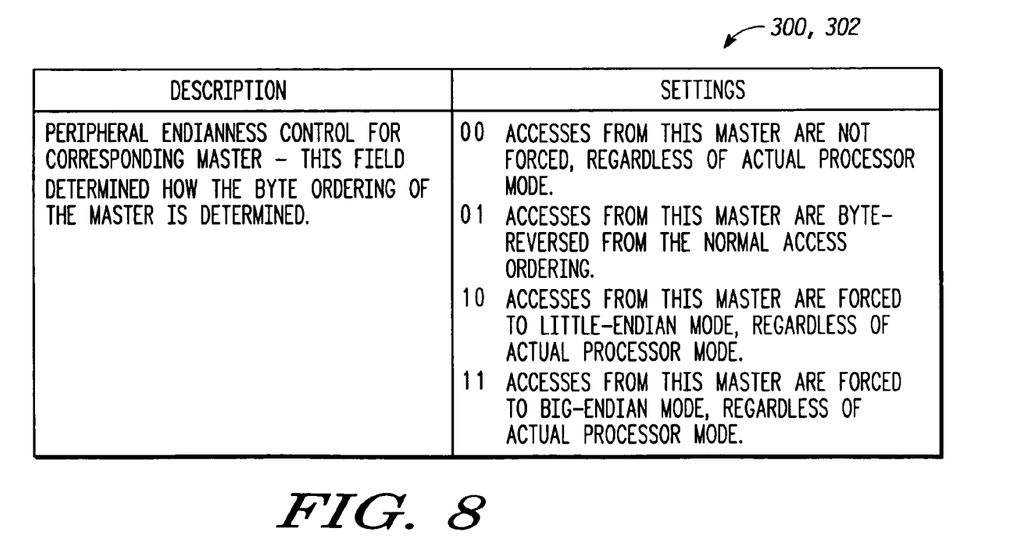
FIG. 8 illustrates descriptions for the peripheral endianness control register of FIG. 7 in accordance with one embodiment of the present invention.

Referring back to FIG. 7, each field 300 and 302 within register 155 provides endianness information for the corresponding master. For example, FIG. 8 illustrates example settings which may be used within each of fields 300 and 302 to provide the endianness information. FIG. 8 will be discussed using bus master 14 peripheral endianness control field 300 as an example; however, note that the descriptions also correspond to the other fields within registers 155 and 156, such as field 302. Therefore, the example settings of FIG. 8 may be used to determine the endianness of bus master 14. Referring to FIG. 8, if field 300 is set to "00", then access from bus master 14 are not forced, regardless of the actual processor mode. That is, in this case, bus master 14 peripheral endianness control field 300 does not override adjusted endian indicator 157. However, if field 300 is set to some value other than "00", then the endianness information provided by field 300 overrides the endianness information provided by master endianness control 132 (which is used, as described above in reference to FIG. 6, to determine adjusted endian indicator 157).

For example, if field 300 is set to "10," then accesses from bus master 14 are forced to little-endian mode, regardless of the actual endian mode of bus master 14. In this case, little-endian mode would be used by signal bridging circuitry 52, regardless of the endian mode indicated by adjusted endian indicator 157, thus possibly overriding the endianness control provided by master endianness control 132. If field 300 is set to "11," then accesses from bus master 14 are forced to big-endian mode, regardless of the actual endian mode of bus master 14. In this case, big-endian mode would be used by signal bridging circuitry 52, regardless of the endian mode indicated by adjusted endian indicator 157. If field 300 is set to "01," then access from bus master 14 are reversed from the mode indicated by adjusted endian indicator 157. For example, if adjusted endian indicator 157 indicates that bus master 14 is operating in big-endian mode, then, if field 300 is set to "01," little-endian mode is used by bridging circuitry 52. In alternate embodiments, a setting of "01" may indicate that a different endianness is used, rather than just the reverse endianness.

Note that the descriptions provided above with respect to FIG. 8 and field 300 also apply to field 302. Also, note that in alternate embodiments, more or less may bits may be used to provide the endianness information, or other settings may be used. For example, in an alternate embodiment, a different set of values may be used for when the bus access is an instruction access or a data access. In this alternate embodiment, based on whether a type indicator indicates data information or instruction information is being accessed during the current access, different sets of values for master endianness control may be applied. Also, in another alternate embodiment, different sets of values may be used based upon the size of the data or information access. For example, one set of values may be used if the current access corresponds to a 16-bit size and a different set of values may be used if the current access corresponds to a 32-bit size. Therefore, each of fields 300 and 302 may include multiple fields rather than the single two-bit field illustrated in FIG. 8 which may be used to control endianness based on the peripheral being accessed, the requesting master, access type, access size, or any combination thereof.

Note that with the use of master endianness controls 132 and 134, an endian indicator from the requesting master, such as endian indicator 137, is not needed. That is, adjusted endian indicator 157 may be set in a variety of different ways with or without the use of endian indicator 137. Also note that in an alternate embodiment, master endianness controls 132 and 134 may not be present. In this alternate embodiment, the endianness for a particular access is controlled by peripheral endianness control registers 154. Alternatively, adjusted endian indicator 157 may also not be present. That is, each of master endianness controls 132 and 134, endian indicator 137, and adjusted endian indicator 157 may or may not be present in data processing system 10. Therefore, peripheral endianness control registers may not have any knowledge of the current master's endianness. In these embodiments, the endianness of an access to a peripheral may be determined based on the endianness information within the peripheral endianness control registers. In an alternate embodiment, only a subset of peripherals may be provided with peripheral endianness control registers. In this case, peripherals which are not provided with peripheral endianness control registers 154 may instead rely on master endianness controls 132 and 134, and signal bridging circuitry 52 uses the value of adjusted endian indicator 157 directly for accesses to those peripherals.

Returning back to FIG. 2, circuitry 48 for accessing peripherals 22, 24 includes peripheral protection determination circuitry 51 which receives adjusted privilege indicator 57, RW indicator 58, and trusted indicator 59 and provides access error signal 60 to bus master attribute determination circuitry 50. (Alternatively or additionally, access error signal 60 may be provided back to the bus master whose request caused the error via system bus 16.) Therefore circuitry 51 uses indicators 57-59 and information stored in peripheral access control registers 54, as was described above, to determine whether the bus access to the requested peripheral is allowed. For example, if bus master 14 initiates a bus access for performing a write to peripheral 22, circuitry 51 determines if the bus access is allowed. For example, circuitry 51 uses adjusted privilege indicator 57 and privilege protect field 82 to determine whether peripheral 22 requires a particular privilege level for accesses (as indicated by field 82) and whether bus master 14 has the required privilege level (as indicated by adjusted privilege indicator 57). Circuitry 51 also uses R/W indicator 58 and write protect field 81 to determine whether the current bus access is a write access, and if so, whether write accesses are allowed to peripheral 22. Circuitry 51 also uses trusted indicator 59 and peripheral trust attribute field 80 to determine whether bus master 14 has the appropriate level of trust (indicated by trusted indicator 59) as required by peripheral 22 (indicated by field 80). Therefore, circuitry 51, using all the above information, can determine whether the bus access requested by bus master 14 to peripheral 22 is allowed. That is, bus master 14 needs to have the appropriate privilege level and the appropriate level of trust, and, if the bus access is a write, peripheral 22 must not be write protected, for the bus access to be allowed.

If access is allowed (meaning the requesting bus master does have the appropriate access permission for the particular peripheral being requested), then operation continues (i.e. the bus access continues) and the necessary bus protocol is provided to complete the operation. For example, signal bridging circuitry 52 provides any appropriate data, address, and control signals to the accessed peripheral derived from control 38, data 40, and address 42. Similarly, signal bridging circuitry 52 returns any necessary control, data, and address information to system bus 16 via control 38, data 40, and address 42. Also, status information may be returned by way of control 38. Signal bridging circuitry 52, based on adjusted endian indicator 157 and peripheral endianness control registers 154, determines the appropriate endian mode to use in completing the access operation. Therefore, as described above, the peripheral endianness control register corresponding to the peripheral being accessed and the field within that register corresponding to the requesting master is used by signal bridging circuitry 52 to determine the endian mode, i.e. to determine the endianness of the information to be transferred during the current access. For example, if the field indicates a "00", then the endian mode indicated by adjusted endian indicator 157 is used by signal bridging circuitry 52 to complete the access. If the field indicates a value other than "00", then signal bridging circuitry 52 operates according to the endian mode indicated by that field. In this manner, the endianness control information within peripheral endianness control registers 154 may be used to affect the endianness order of information transferred during the current access.

However, if access is not allowed by peripheral protection determination circuitry 51 (meaning the requesting bus master does not have the appropriate access permission for the particular peripheral being requested), the bus access is terminated prior to accessing the peripheral. Also, access error signal 60 may be used to indicate that the requesting bus master is denied access to the peripheral. Also, a bus error may be provided via system bus 16 to the requesting bus master. The bus error can be provided by bus master permission determination circuitry 50 as one of control signals 38. In response, the requesting bus master may perform appropriate exception handling to recover from the bus error. Alternatively, if access is not allowed, a reset of all or a portion of data processing system 10 may be performed.

As discussed above, a trusted bus master may dynamically change permissions in registers 30 and 54 as necessary. In one embodiment, the trusted bus master may change permissions in response to the initiation of a software application. For example, an untrusted bus master may alert a trusted bus master that it is preparing to begin a software application. In response, the trusted bus master may update registers 30 and 54 in order to provide the untrusted bus master access to the necessary peripheral in order to complete its application. Upon completing the application, the trusted bus master may revoke the permissions previously granted such that permissions are only granted on an application by application basis.

Also, as discussed above, peripheral endianness control registers and master endian control fields may be used to allow for dynamic and flexible control of the endian mode of a particular access on an access by access basis. The use of peripheral endianness control registers (associated with each peripheral) may be used to override the default endian mode indicated by the requesting master, as needed. This may provide for the ability to handle software using a different endian mode than the one in which the master normally operates, and may provide for the ability to emulate a previous bridging configuration from a different system, thus allowing for software written for the previous configuration to be reused.

In an alternate embodiment, peripheral 22 or 24 may be a memory unit where peripheral registers 21 or 25 may be memory locations. Registers 30 and 54, in this embodiment, can define access permissions corresponding to each bus master to specific memory locations or portions of the memory unit. Similarly, registers 154, in this embodiment, can provide endianness information corresponding to each bus master to specific memory locations or portions of the memory unit.

Also note that in alternate embodiments, the information stored in registers 30 can be located within each corresponding master and the information stored in registers 54 and 154 can be located within each peripheral rather than in bus interface 18. Furthermore, the bus master permission determination circuitry may also be located in or next to the masters and the peripheral protection determination circuitry and signal bridging circuitry can be located in or next to the peripherals such that permission and the endian mode (if so indicated by the corresponding field within the peripheral endianness control registers) is determined by the peripheral. Therefore, alternate embodiments may store the information of registers 30, 54, and 154 that is accessible by a trusted bus master or other bus master in any place within data processing system 10. Also, data processing system 10 may include any number of trusted bus masters or other bus masters that are capable of updating the permission and endian information, and is not limited to a single secure bus master.

Figure 5:
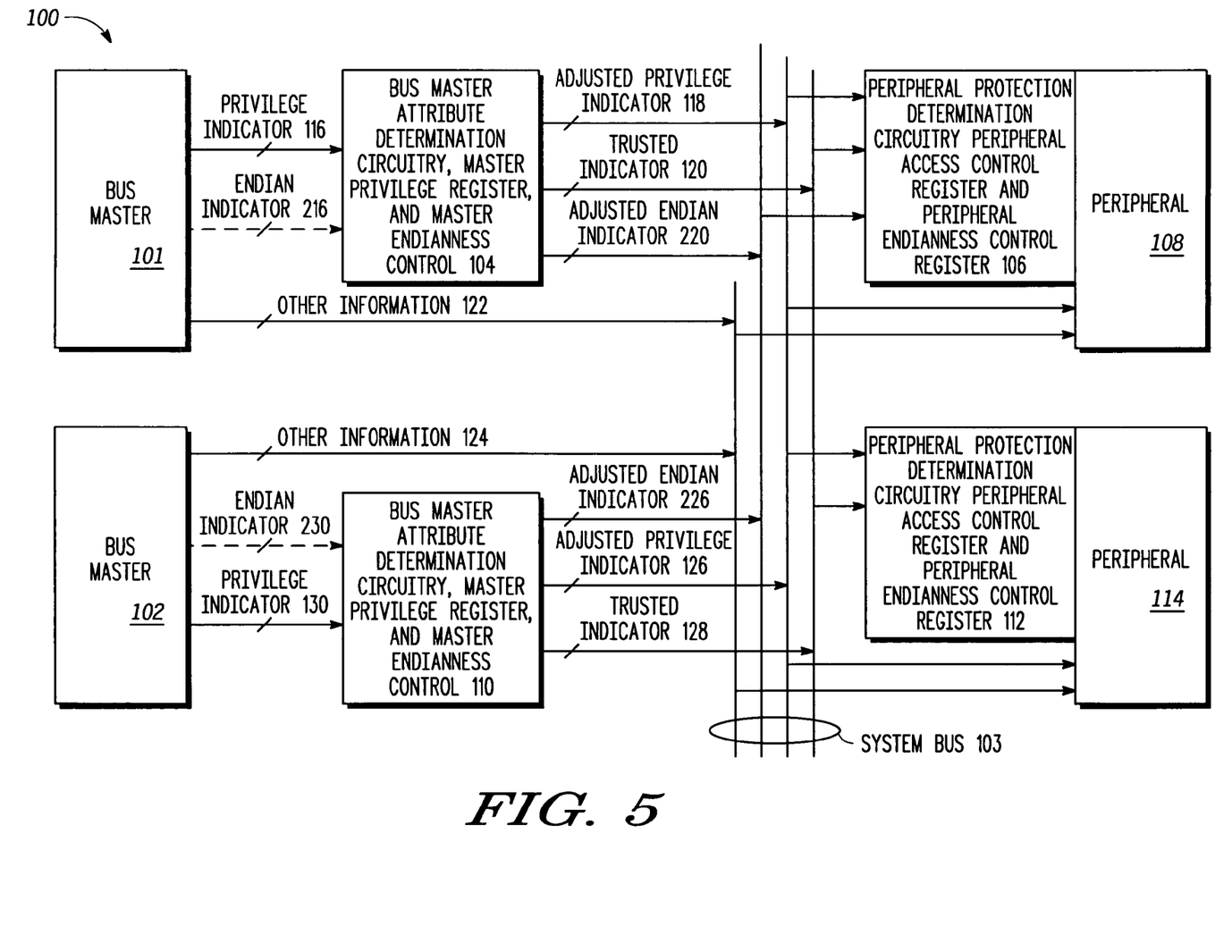
FIG. 5 illustrates, in block diagram form, a data processing system in accordance with an alternate embodiment of the present invention.

FIG. 5 illustrates data processing system 100 in accordance with an alternate embodiment of the present invention. Data processing system 100 includes bus master 101, bus master 102, bus master attribute determination circuitry, master privilege register, and master endianness control 104, bus master attribute determination circuitry, master privilege register, and master endianness control 110, peripheral protection determination circuitry, peripheral access control register, and peripheral endianness control register 106, peripheral protection determination circuitry, peripheral access control register, and peripheral endianness control register 112, and peripherals 108 and 114.

Bus master 101 provides privilege indicator 116 and, optionally, endian indicator 216 to bus master attribute determination circuitry, master privilege register, and master endianness control 104, which provides adjusted privilege indicator 118 via a system bus 103 to peripheral protection determination circuitry, peripheral access control register, and peripheral endianness control registers 106 and 112 and to peripherals 108 and 114, provides trusted indicator 120 via system bus 103 to peripheral protection determination circuitry, peripheral access control register, and peripheral endianness control registers 106 and 112, and provides adjusted endian indicator 220 via system bus 103 to peripheral protection determination circuitry, peripheral access control register, and peripheral endianness control registers 106 and 112. Bus master 101 also provides other information 122 via system bus 103 to peripheral protection determination circuitry, peripheral access control register, and peripheral endianness control registers 106 and 112 and to peripherals 108 and 114.

Bus master 102 provides privilege indicator 130 and, optionally, endian indicator 230 to bus master attribute determination circuitry, master privilege register, and master endianness control 110, which provides adjusted privilege indicator 126 via a system bus 103 to peripheral protection determination circuitry, peripheral access control register, and peripheral endianness control registers 106 and 112 and to peripherals 108 and 114, provides trusted indicator 128 via system bus 103 to peripheral protection determination circuitry, peripheral access control register, and peripheral endianness control registers 106 and 112, and provides adjusted endian indicator 226 via system bus 103 to peripheral protection determination circuitry, peripheral access control register, and peripheral endianness control registers 106 and 112. Bus master 102 also provides other information 124 via system bus 103 to peripheral protection determination circuitry, peripheral access control register, and peripheral endianness control registers 106 and 112 and to peripherals 108 and 114.

In operation, data processing system 100 operates similarly to data processing system 10. For example, masters 101 and 102 may be similar to masters 14 and 15, and peripherals 108 and 114 may be similar to peripherals 22 and 24. Also, data processing system 100 may include any number of masters and any number of peripherals. However, in data processing system 100, portions of bus interface 18 are distributed to different locations. Also, in data processing system 100, trusted indicators 120 and 128 are provided via system bus 103 to peripheral protection determination circuitry, peripheral access control register, and peripheral endianness control registers 106 and 112. Also, privilege indicators 116 and 130 are selectively modified by bus master attribute determination circuitry, master privilege register, and master endianness control 104 and 110, respectively, and provided as adjusted privilege indicators 118 and 126 via system bus 103 to peripheral protection determination circuitry, peripheral access control register, and peripheral endianness control registers 106 and 112 and peripherals 108 and 114. Adjusted endian indicators 220 and 226 are generated by bus master attribute determination circuitry, master privilege register, and master endianness control 104 and 110 based on endian indicators 216 and 230 (if present) and master endianness control Note that each of bus master attribute determination circuitry, master privilege registers, and master endianness control 104 and 110 operate similarly to bus master attribute determination circuitry 50 and master privilege registers 30 described above in reference to FIGS. 2-4. For example, the information stored in the master privilege registers (including the master endianness control fields) and peripheral access control registers are used in the same manner to determine whether a bus access is allowed and to determine an endian mode. Other information 122 and 124 may include information like control 38, data 40, address 42, and bus master identifier 36. Therefore, the same signals may be used as described in FIGS. 1-4 above; however, the circuitry which generates the signals or some of the signals themselves may be located in different places or structured differently.

Note that in the illustrated embodiment of FIG. 5, each bus master 101 and 102 has a corresponding bus master attribute determination circuitry, master privilege register, and master endianness control. Therefore, the determination circuitry, master privilege register, and master endianness control are distributed with each master. For example, each determination circuitry, master privilege register, and master endianness control can include the privilege level and trust attribute fields (such as fields 70-72 and 74-76) and master endianness control field (such as fields 132 and 134) corresponding to its corresponding bus master. The circuitry and the information stored in the master privilege register (including the master endianness control fields) can be located within each master or in communication between the master and the system bus. Also, the peripheral protection determination circuitry 51, the peripheral access registers 54, and the peripheral endianness control registers 154 may be distributed with each peripheral. For example, as illustrated in FIG. 5, each peripheral 108 and 114 has a corresponding peripheral protection determination circuitry, peripheral access control register, and peripheral endianness control register where each peripheral protection determination circuitry, peripheral access control register, and peripheral endianness control register can include access control fields (such as fields 80-82 and 84-86) and peripheral endianness control fields (such as fields 300 and 302) corresponding to its corresponding peripheral. Also note that peripherals 108 and 116 may be any type of peripheral, memory device, or bus slave, as described earlier with reference to data processing system 10, thus are not limited in scope to a particular function. Also, note that portions of signal bridging circuitry 52 which utilize the selected endianness mode may also be distributed with each peripheral. Therefore, the distributed signal bridging circuitry can perform the requested access using the appropriate endian mode based on the adjusted endian indicator and the peripheral endianness control register of the corresponding peripheral. Alternatively, portions of signal bridging circuitry 52 may be distributed with each peripheral and other portions with each bus master. Note that endian indicators 216 and 230, adjusted endian indicators 220 and 226, master endianness control, and peripheral endianness control register operate as was described above in reference to FIGS. 1-8.

Note that although FIGS. 1 and 2 illustrate the use of bidirectional conductors, it should be understood that a combination of unidirectional conductors may be used instead. Alternatively, a combination of bidirectional and unidirectional conductors may used. Signals may also be transferred serially via a single conductor or in parallel via a plurality of conductors. Alternatively, signals may be time multiplexed on a single or a plurality of conductors. Also, note that signals illustrated as bidirectional conductors may be replaced with unidirectional conductors, and unidirectional conductors may be replaced with bidirectional conductors.

In the foregoing specification, the invention has been described with reference to specific embodiments. However, one of ordinary skill in the art appreciates that various modifications and changes can be made without departing from the scope of the present invention as set forth in the claims below. For example, it should be understood that data processing system 10 and 100 could be any type of data processing system which can be located on a single chip or integrated circuit (IC) or a combination of chips or ICs. Data processing system 10 and 100 can also apply to a variety of masters and slaves located on a network (coupled via a network system bus) having shared peripherals. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for endianness control in a system comprising a bus master and a peripheral, the method comprising:

receiving by the peripheral, a request from the bus master to access the peripheral, the request indicating an actual endianness mode associated with the bus master;

the peripheral accessing a peripheral endianness control register;

when the peripheral endianness control register has a first value, the peripheral granting access to its data in a little-endian mode regardless of the actual endianness mode associated with the bus master; and when the peripheral endianness control register has a second value, the peripheral granting access to its data in a big-endian mode regardless of the actual endianness mode associated with the bus master.

2. The method of claim 1 further comprising when the peripheral endianness control register has a third value, the peripheral granting access to its data in a mode that is reverse of the actual endianness mode associated with the bus master.

3. The method of claim 1 further comprising when the peripheral endianness control register has a fourth value, the peripheral granting access to its data in the actual endianness mode associated with the bus master.

4. The method of claim 1 further comprising a control circuitry receiving the request from the bus master and the control circuitry accessing a bus master endianness control register.

5. The method of claim 4 further comprising when the bus master endianness control register has the first value, the control circuitry modifying the actual endianness mode associated with the bus master.

6. The method of claim 5, wherein modifying the actual endianness mode associated with the bus master comprises reversing the actual endianness mode associated with the bus master.

7. The method of claim 1, wherein the peripheral comprises a universal asynchronous receiver transmitter (UART), a real time clock (RTC), or a keyboard controller.

8. The method of claim 1, wherein the actual endianness mode relates to at least one of byte ordering of the data and bit ordering of the data.

9. A method for endianness control in a system comprising a bus master and a peripheral, the method comprising:

receiving by the peripheral, a request from the bus master to access the peripheral, the request indicating an actual endianness mode associated with the bus master;

the peripheral accessing a peripheral endianness control register;

when the peripheral endianness control register has a first value, the peripheral granting access to its data in a little-endian mode regardless of the actual endianness mode associated with the bus master;

when the peripheral endianness control register has a second value, the peripheral granting access to its data in a big-endian mode regardless of the actual endianness mode associated with the bus master;

when the peripheral endianness control register has a third value, the peripheral granting access to its data in a mode that is reverse of the actual endianness mode associated with the bus master; and when the peripheral endianness control register has a fourth value, the peripheral granting access to its data in the actual endianness mode associated with the bus master.

10. The method of claim 9 further comprising a control circuitry receiving the request from the bus master and the control circuitry accessing a bus master endianness control register.

11. The method of claim 10 further comprising when the bus master endianness control register has the first value, the control circuitry modifying the actual endianness mode associated with the bus master.

12. The method of claim 11, wherein modifying the actual endianness mode associated with the bus master comprises reversing the actual endianness mode associated with the bus master.

13. The method of claim 9, wherein the peripheral comprises a universal asynchronous receiver transmitter (UART), a real time clock (RTC), or a keyboard controller.

14. The method of claim 9, wherein the actual endianness mode relates to at least one of byte ordering of the data and bit ordering of the data.

* * * * *